Patented Aug. 5, 1947

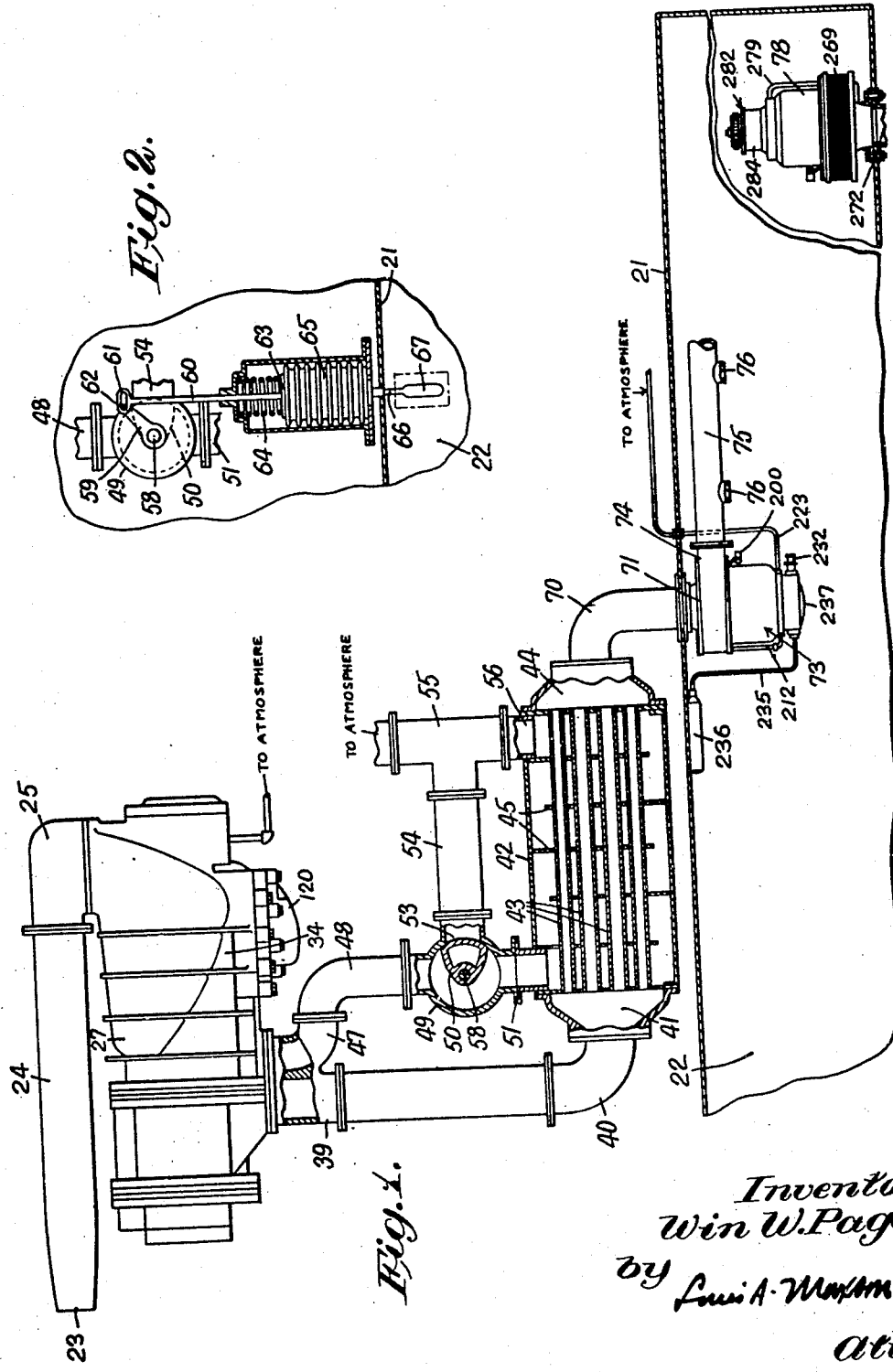

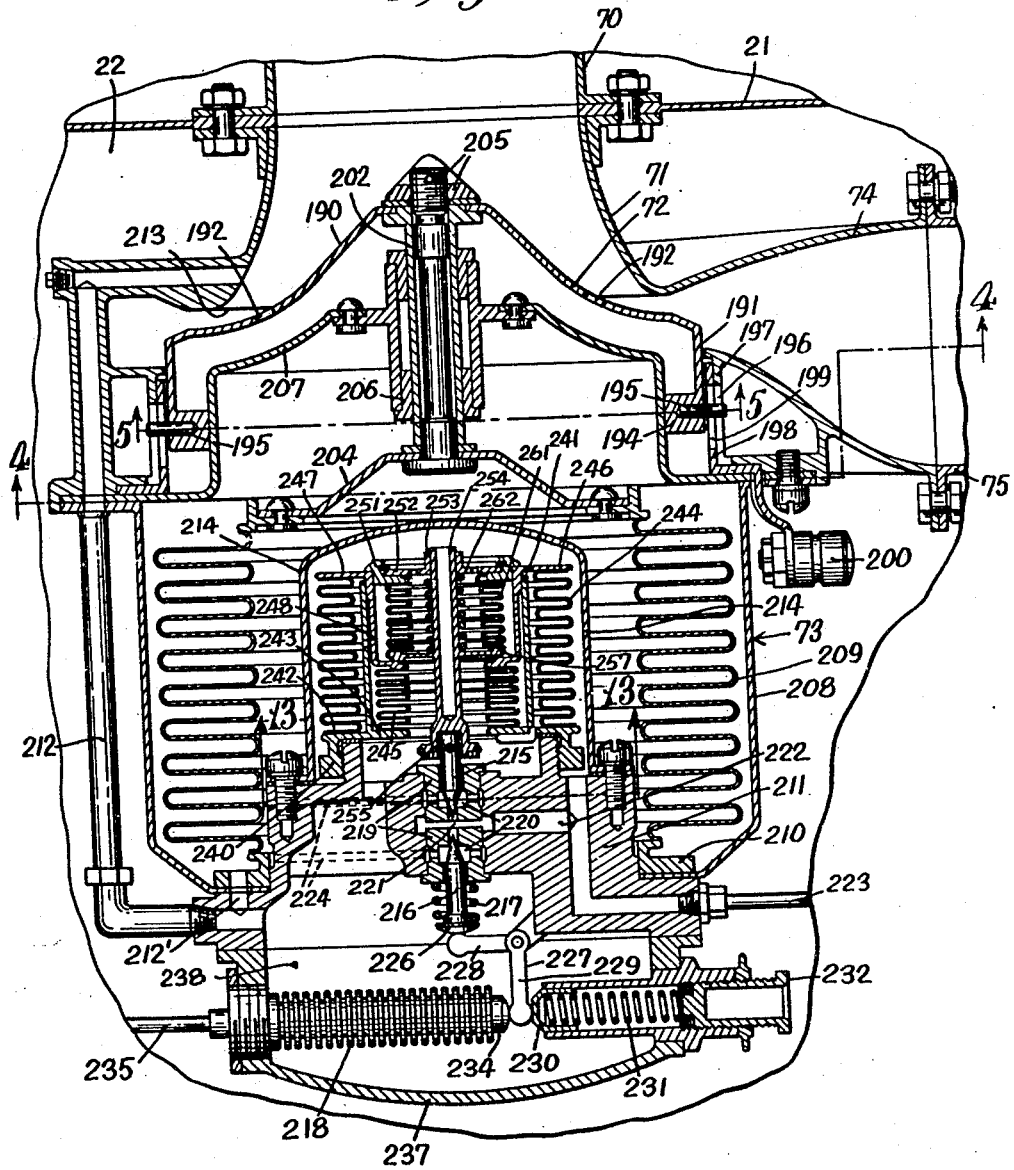

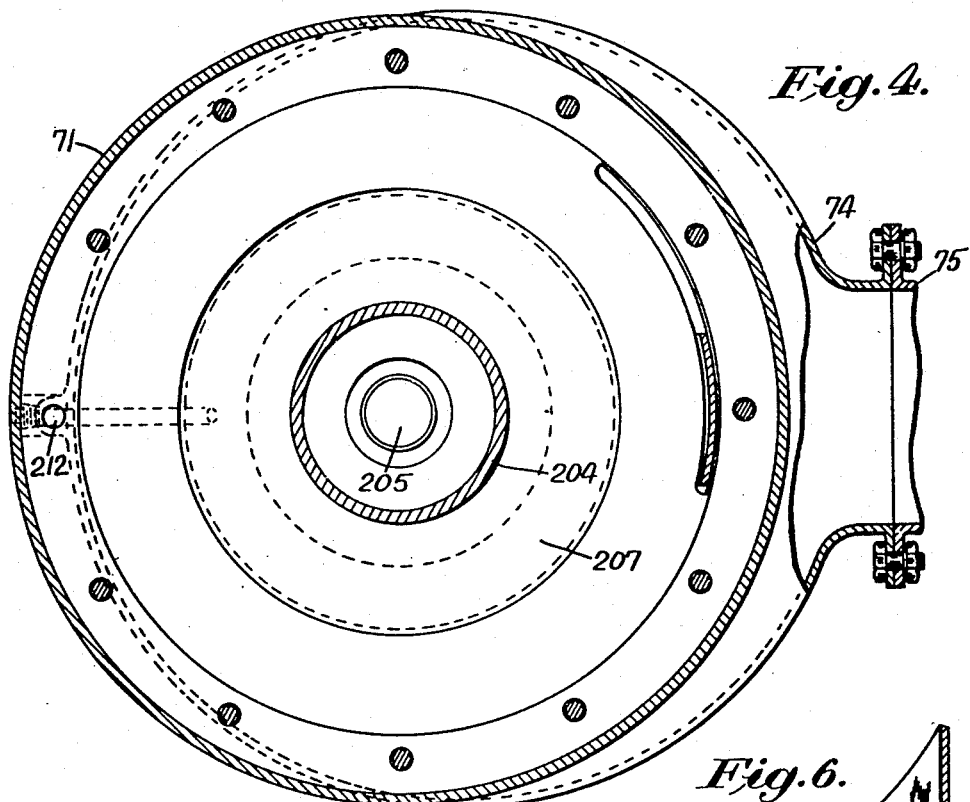
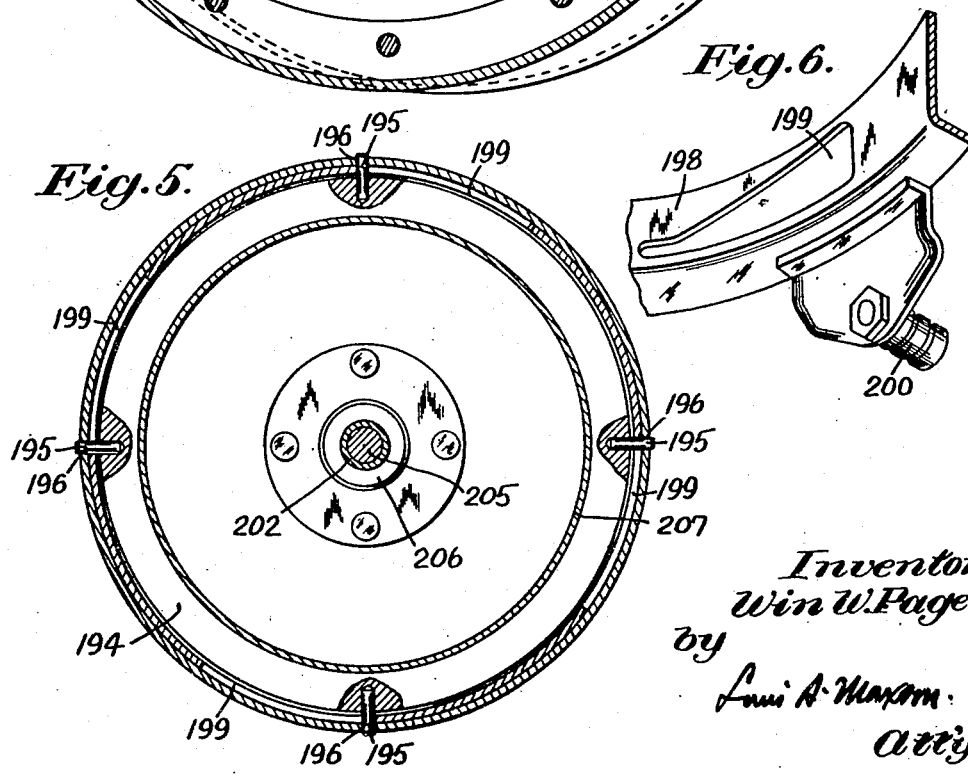

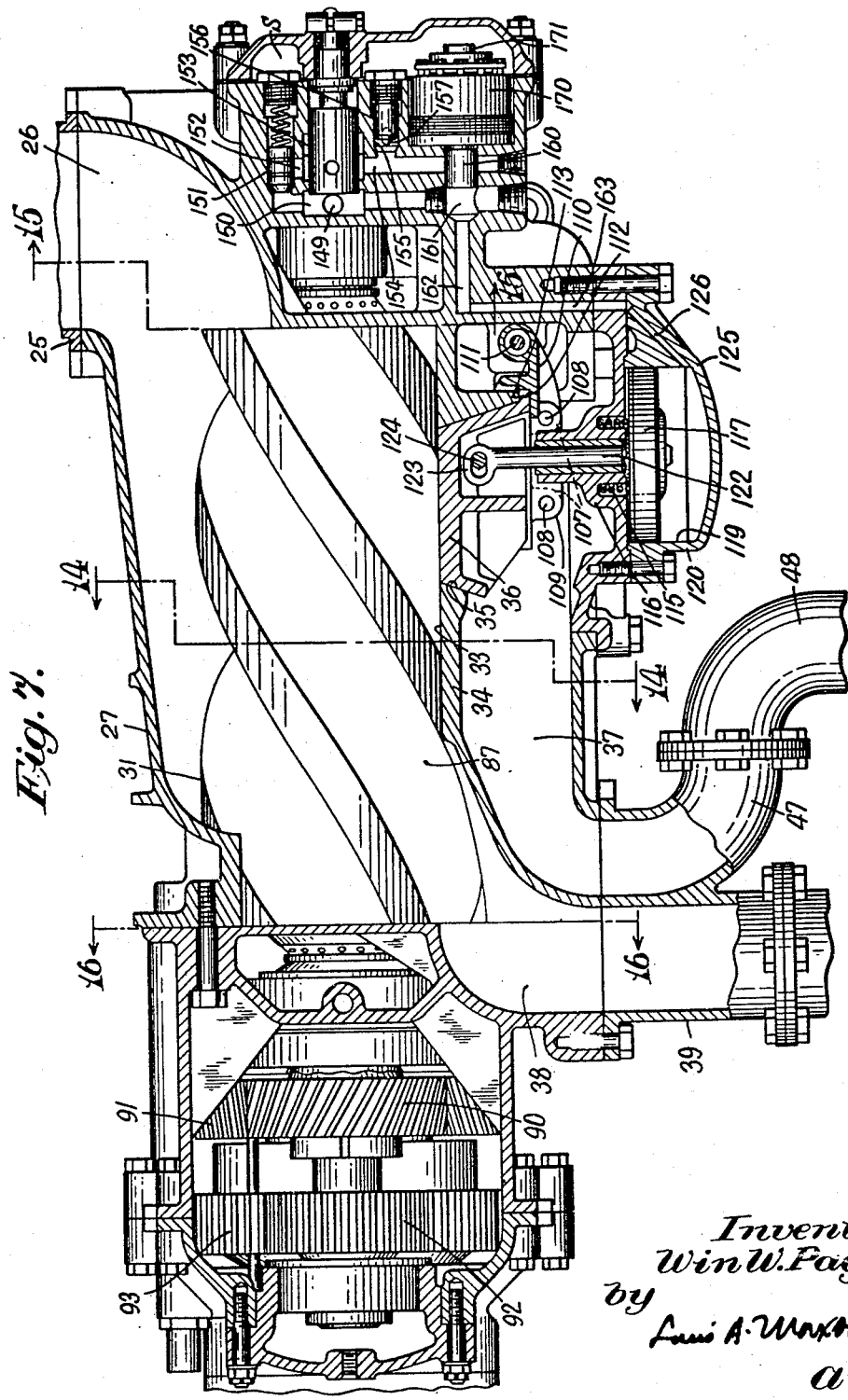

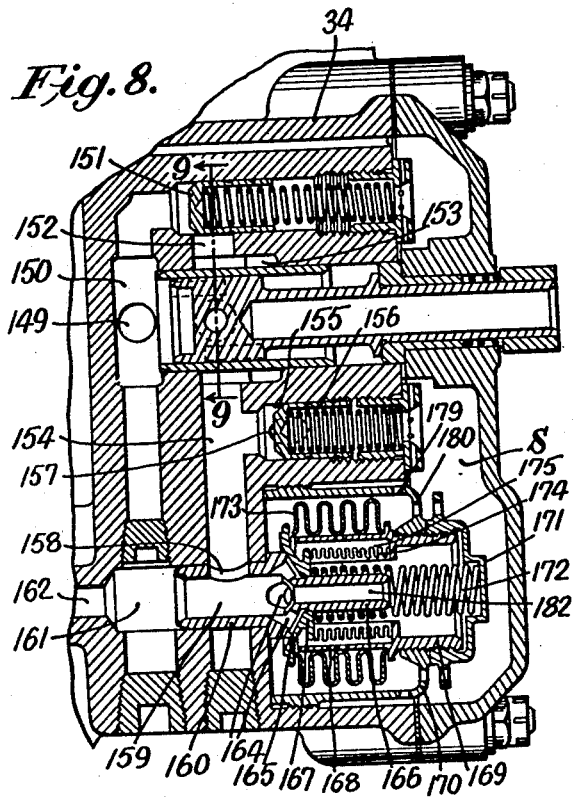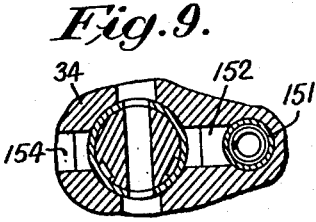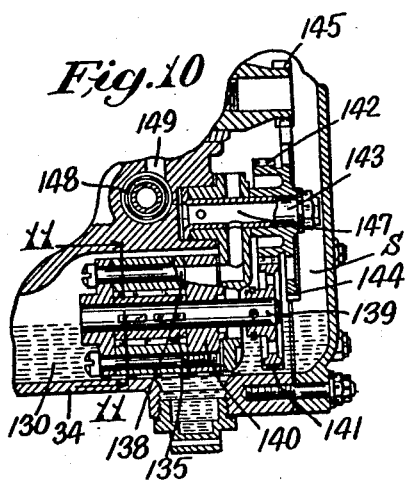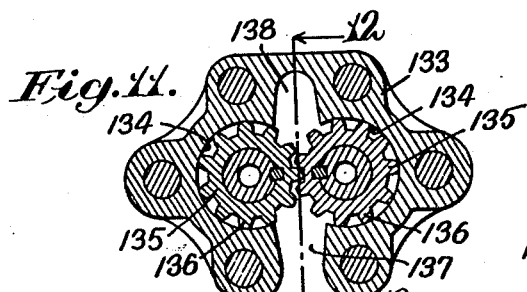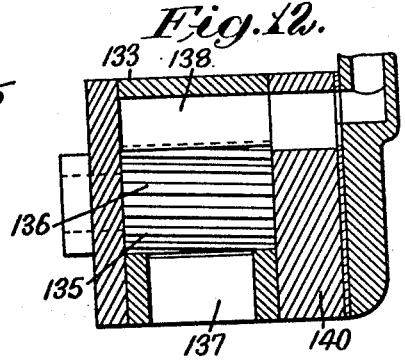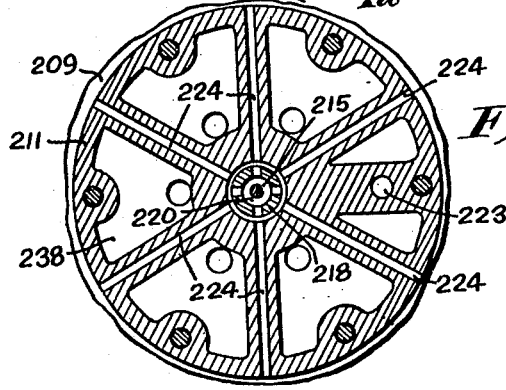

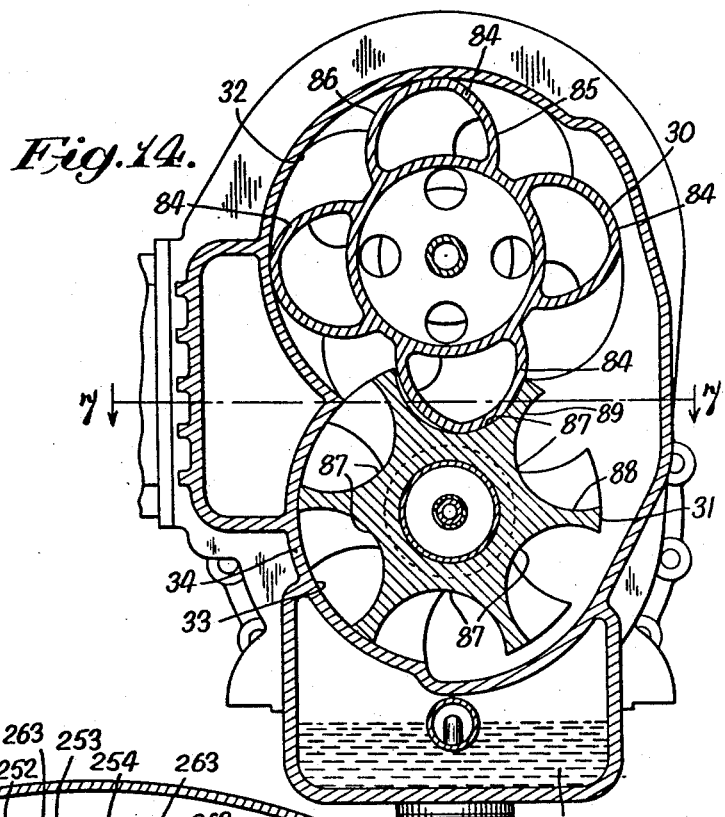
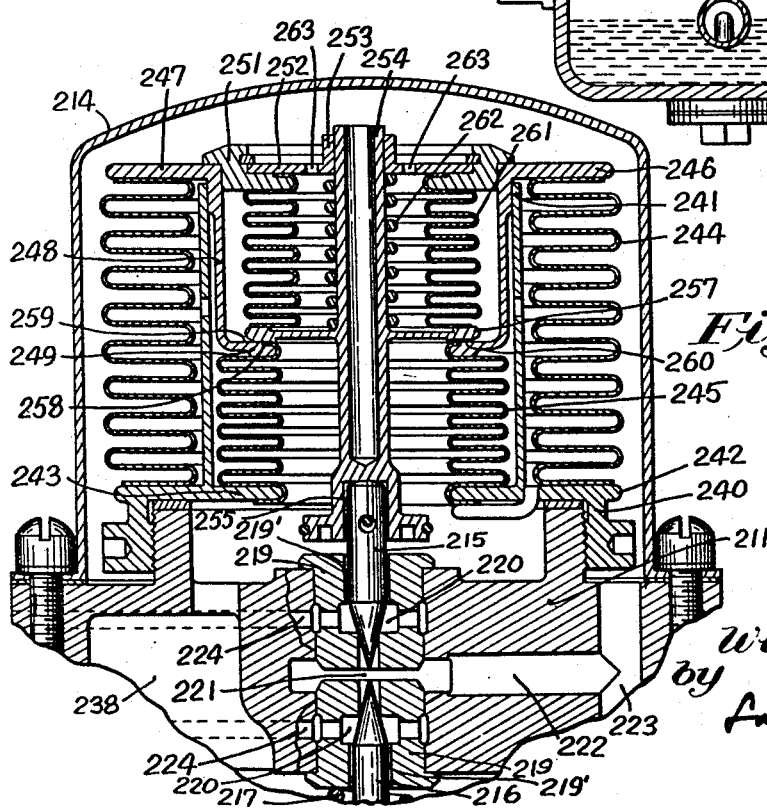

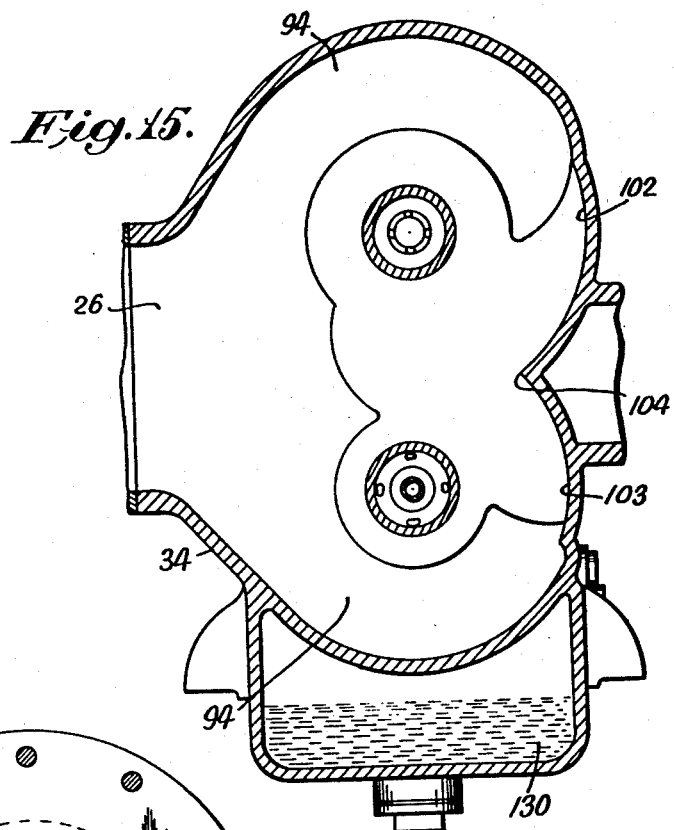
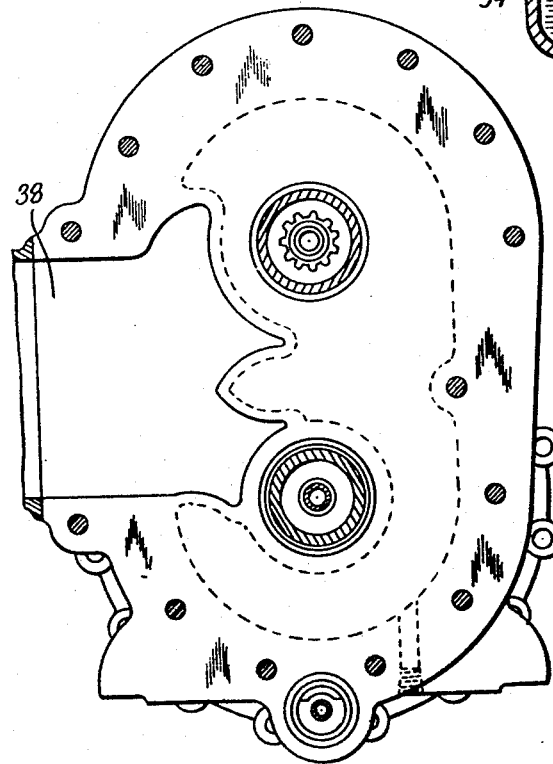

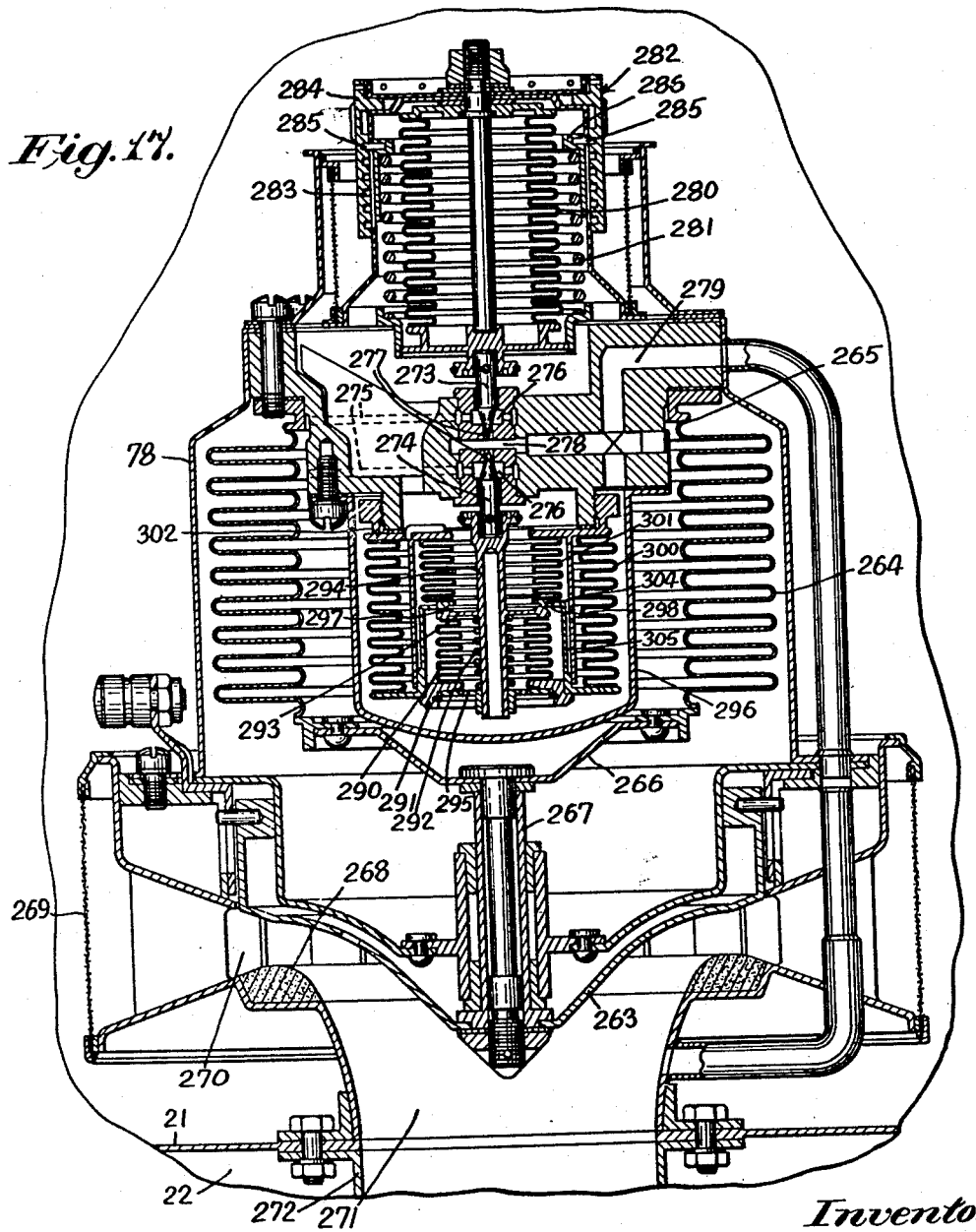

2,425,000

UNITED STATES PATENT OFFICE 2,425,000

APPARATUS FOR AUTOMATICALLY CONTROLLING PRESSURE AND TEMPERATURE WITHIN AIRCRAFT CABINS

Win W. Paget, Michigan City, Ind., assignor to Joy Manufacturing Company, a corporation of Pennsylvania Application March 27, 1943, Serial No. 480,828

27 Claims. (Cl. 98—1.5)

My invention relates to cabin condition controlling apparatus, and from one aspect to cabin pressure and temperature controlling systems, and from another aspect to valve mechanisms governed by pressure and temperature conditions for regulating the temperature of the air supplied to an aircraft cabin or similar space.

In the field of high altitude flight, pressurized cabins present one of the best modes—and at extremely high altitudes the only practicable mode—of operating aircraft. The maintenance of reasonably satisfactory temperature conditions in such cabins, as well as adequate pressures, is an important problem. In the pressurizing operation, whether accomplished by centrifugal superchargers or by other devices for increasing the pressure of the air supplied to the cabin, there is a substantial increase in the temperature of the air, and this increase in the heat content of the air may be utilized in the heating of the cabin.

The utilization of this system of imposing an additional back pressure on the cabin supercharger is subject to a serious disadvantage in that if the temperature selected were suitable for adequate heating at medium and high altitudes, the supercharger could be greatly overloaded at sea level—a condition which could not be risked with the designs of superchargers for aircraft requiring very close clearances and minimum weights. I have accordingly provided means for automatically overriding the temperature control of the back pressure valve in such a way that either the occurrence of a given differential between supercharger intake and discharge at low altitudes or a predetermined maximum compression ratio irrespective of altitude will prevent the imposition of a further back pressure on the supercharger.

In a desirable form of pressurizing device an arrangement is provided whereby coacting rotors are adapted to form pockets in which air is enclosed, and upon rotation of the rotors the pockets diminish in volume and the air is compressed, and after compression through the desired ratio the air is delivered through passages, into communication with which the pockets move, into the cabin. As, in the design of such a device, it is not desirable, for weight reasons, to provide the parts of such size and strength as safely to enable maintained compression through the designed maximum range except when the plane is at such a height that the total weight of air pumped will be much less than at sea level, there is included in the preferred type of pressurizing device mentioned an unloading mechanism which prevents substantial actual compression until a desired height is reached, such as 20,000 feet; and the air taken in at the intake is freely discharged until the rotor pockets move out of communication with a suitably valve-controlled unloader port, and the air in the pockets, as these move out of communication with the outlet port mentioned, is delivered by mere displacement to the cabin of the plane; although if the aircraft cabin pressure exceeds intake pressure there may be a back pressure on the pressurizing device which will necessitate the doing of work on the air and an increase in the temperature of it. Of course, with other types of superchargers, such as centrifugal superchargers, the same principle applies as to the portion of the rotors beyond the outlet port mentioned.

Now the maximum compression range for devices of the character mentioned above may not desirably exceed three to four compressions, and for centrifugal superchargers the maximum ratio should not exceed three compressions, and this compression ratio should not be utilized at sea level, but only at high altitudes, as previously explained. Accordingly, when a cabin pressure corresponding to external pressure of say 8000 feet is to be maintained over a wide range of higher flight levels and provision is to be made for a maximum ratio of compression to be reached only at a height of 35,000 to 40,000 feet, the supercharger, whatever its type, must not be caused to operate against a back pressure in excess of seven and one-half pounds for any material time at sea level. If a back pressure of that value is imposed on the discharge, there will be an increase in the temperature of the discharged air of 65° F., and this is obviously sufficient to aid greatly in cabin heating and to require under some conditions cooling to prevent excessive cabin temperatures.

My invention from one aspect, in a preferred embodiment thereof, comprises means for imposing a back pressure on the discharge of a supercharger which delivers air to an aircraft cabin, and back pressure imposing means which is provided with means for automatically limiting the maximum differential in pressure between intake and discharge, and with means for automatically limiting the maximum compression ratio, and with means for automatically controlling, within the limits imposed by said automatic means, the degree of back pressure imposed on the supercharger in accordance with cabin temperature variations. From another aspect my invention includes, in a preferred embodiment, an improved supercharger having means for delivering a substantial volume of air without material compression to a heat exchanger or returning the same to the outside of the aircraft, and means controlling the distribution of the air so pumped automatically in accordance with the cabin temperature variations, said supercharger having, further, means for delivering an additional quantity of air, against an automatically controlled and limited back pressure, through the heat exchanger and past a back pressure imposing valve whose position is automatically controlled by cabin temperature, subject to an overriding, automatic control if either a predetermined maximum desired differential between back pressure and external pressure is attained or if a predetermined maximum desired ratio between back pressure and intake pressure is reached. From still another aspect my invention comprises an improved automatic valve having improved controlling means responsive to temperature and pressure conditions.

It is an object of my invention to provide an improved aircraft cabin pressurizing system. It is another object of my invention to provide an improved aircraft cabin pressurizing system having improved means incorporated therein for controlling cabin temperature. It is still another object of my invention to provide an improved aircraft cabin pressurizing system having incorporated therein improved means selectively effective to heat or to cool air in transit to the cabin. Still another object of my invention is to provide an improved controlling valve. Yet a further object of my invention is to provide an improved controlling valve having incorporated therein improved temperature and pressure reponsive controlling means.

In the accompanying drawings in which for purposes of illustration a preferred embodiment of my invention from its several aspects is shown for purposes of illustration:

Fig. 1 is a generally diagrammatic view with parts in section showing a cabin pressure and temperature controlling system.

Fig. 2 is a view partially in section showing a control device for a flow distributing valve which forms a part of the system of Fig. 1.

Fig. 3 is a view in central vertical section through a back pressure valve forming a portion of the system shown in Fig. 1, and itself embodying one aspect of my invention.

Fig. 4 is a section on the plane of the line 4—4 of Fig. 3.

Fig. 5 is a section on the plane of the line 5—5 of Fig. 3.

Fig. 6 is a fragmentary perspective view showing a portion of a manual controlling device for optionally locking the back pressure controlling valve out of operation.

Fig. 7 is a view in central longitudinal section on the plane of the line 7—7 of Fig. 14, through the supercharger, with parts shown in elevation.

Fig. 8 is a view on the same plane, but on an enlarged scale, showing, with additional parts in section, the controlling mechanism shown in elevation in Fig. 7.

Fig. 9 is a detail sectional view on the plane of the line 9—9 of Fig. 8.

Fig. 10 is a sectional view of an oil pump.

Fig. 11 is a transverse section on the plane of the line 11—11 of Fig. 10.

Fig. 12 is a section on the plane of the line 12—12 of Fig. 11.

Fig. 13 is a section on the plane of the line 13—13 of Fig. 3.

Fig. 14 is a central vertical section on the plane of the line 14—14 of Fig. 7.

Fig. 15 is a vertical sectional view on the plane of the line 15—15 of Fig. 7, showing the passaging at the intake end of the supercharger.

Fig. 16 is a vertical section on the plane of the line 16—16 of Fig. 7, showing the passaging at the discharge end of the supercharger.

Fig. 17 is a central longitudinal section through a cabin vent valve whose function it is to maintain automatically the cabin pressure.

Fig. 18 is an enlarged sectional view on the same plane as Fig. 3, illustrating on a larger scale details of construction.

Referring to the drawings, it will be noted that there is indicated at 21 the bounding wall of a space 22 intended for pilot or passenger occupancy as the case may be. Suitably supported also by the aircraft of which the compartment 22 forms a part is a rammed inlet connection 23 opening, for example, through the front surface of a wing (not shown); and this rammed inlet has in communication with it a conduit 24 which is connected through an elbow 25 with the intake space 26 of a supercharger 27 whose construction will shortly be described in greater detail. This supercharger may be driven in any suitable manner and preferably at different speeds, as explained in my copending application Serial No. 458,641, filed September 17, 1942, from an aircraft engine, not shown; and it comprises intermeshing rotors 30, 31 disposed in intersecting bores 32 and 33 in a casing 34. The casing 34 has a discharge opening 35 controlled by a valve 36 whose construction and method of control will be more fully described hereinafter, and this opening 35 is designed to permit free passage of air received in the pockets formed between the housing and the peripheral convolutions of the rotors into a chamber 37 until such time as such pockets move out of communication with the opening 35. A second passage 38 is arranged at the discharge end of the supercharger 27, and to this space air is delivered either by mere displacement, when the valve 36 is open, or after an actual compression through a given range when the valve 36 is closed. The passage 38 communicates with a conduit 39 which conducts the main discharge from the supercharger 27, and this conduit 39 in turn communicates through an elbow 40 with an end chamber 41 of a heat exchanger 42, the inner pass of which is formed by a series of tubes 43, the one ends of which are in free communication with the chamber 41 and the other ends of which are in free communication with a chamber 44. The outer pass of this heat exchanger is formed by a series of oppositely extending baffles 45, 45 which provide a tortuous passage back and forth around the tubes, progressively lengthwise of the heat exchanger. The chamber 37 is connected herein by an elbow 47 with a conduit 48 which opens into a valve casing 49 in which a valve element 50 is rotatably supported for control by means hereinafter described. In line with the conduit 48 is a further conduit 51 opening into the supply end of the outer course of the heat exchanger 42, and at right angles to the opening 51 there is another opening 53 which is connected by a conduit 54 with a conduit 55 one end of which communicates, as at 56, with the discharge end of the outer course of the heat exchanger and the other end of which is connected in any suitable manner (not shown) with the atmosphere, as indicated by the legend. The valve 50 is provided with an operating shaft 58 having a lever 59 thereon by which the valve is moved through the action of a rod 60 having an eye 61 cooperating with a pin 62 on the arm 59. The rod 60 has a head 63 on which a spring 64 acts normally to move the valve 50 towards a position in which fluid passing into the valve casing 49, through the conduit 48, may be delivered through the conduit 54 and to the atmosphere, whereby only a part or even none of such fluid may be permitted to pass through the outer course of the heat exchanger. An expansible bellows device 65 is provided with whose interior a tube 66 communicates, the tube 66 having formed on the end thereof a thermostat bulb 67 which is arranged within the space 22 and adapted, upon an increase in the temperature in the cabin space 22, to provide fluid pressure to move the valve 50 in a direction to diminish the free flow from the conduit 48 to the atmosphere and to require increasing amounts of this air to pass through the outer course of the heat exchanger. From the discharge chamber 44 of the inner course of the heat exchanger a conduit 70 leads to a valve casing 71 in which there is arranged a back pressure valve 72 (Fig. 3) whose position is both manually controllable and automatically controllable by means which will shortly be described. The function of this valve is to provide a back pressure against which the supercharger must deliver air through the conduit 39, and said valve has controlling means generally designated 73 for effecting a control thereof in accordance with cabin temperature variations but subject to an overriding, automatic control if either a predetermined maximum desired differential between back pressure and external pressure is attained or if a predetermined maximum desired ratio between back pressure and intake pressure is reached. The structure of this back pressure controlling valve mechanism will shortly be more fully described. The back pressure controlling valve mechanism has a delivery passage 74 which communicates with ducting 75 of any suitable type, and herein diagrammatically shown, opening into the cabin through vents 76. For the purpose of controlling the pressure in the cabin an automatic cabin vent valve 78, which may be of a construction such as is illustrated in my copending application Serial No. 468,938, is provided, and this vent valve functions to permit cabin pressure to vary substantially directly with external pressures up to a predetermined altitude such as 8000 or 10,000 feet, and then during certain further increase in altitudes to maintain cabin pressure substantially constant, and when a still higher altitude is reached, say 30,000 feet, to provide for the maintenance of a relatively constant differential in pressure between cabin pressure and external pressure, and when a still higher altitude is reached, say 40,000 feet, to provide for the maintenance of a cabin pressure which shall bear a relatively constant ratio to the external pressure. The supercharger disclosed and its unloading means, the back pressure valve and its controlling means, and some at least of the details of the cabin pressure vent valve may now be successively described, before the operation of the improved system as a whole is taken up.

*The supercharger and its unloading means*

As previously explained, the supercharger 27 comprises intermeshing rotors 30 and 31 disposed in intersecting bores 32 and 33 in the casing 34.

While it will be understood that it would be possible to use rotors having generated curves and generated lobes, in the construction shown I have illustrated the rotor 30 as a male rotor comprising four helically arranged lobes 84, the rearward sides 85 of which are shown as generated curves in profile, while the leading or pressure side 86 of each of these lobes is in profile substantially in the form of a circular arc. The female rotor 31 is provided in the form shown with six helically arranged grooves 87, adapted to cooperate with the lobes of the rotor 30 and the leading concave surfaces 88 of the grooves 87 are in profile substantially in the shape of an arc, to coact with the arcuate pressure surfaces 86 of the lobes of the rotor 30, while the following concave surfaces 89 of the grooves 87 are generated grooves in profile. The rotors are adapted to operate with space packing, that is to say, they are maintained in such relation to each other through gearing that there is no actual contact between the rotors with each other, although their coacting surfaces are very close together. Herein a gear 90 is operatively connected with the rotor 30 and a gear 91 with the rotor 31, so that the rotors are maintained in the desired out of contact relation. Any suitable means such, for example, as is shown in my copending application Serial No. 458,641, and including the gears 90, 91 and additional gears 92 and 93, may be used for the drive of the rotors. The intake space 26 of the supercharger communicates with the right hand, low pressure ends of the rotors and also for a substantial part of the length of the rotors communicates with the back portions thereof, so to speak, the portions at the opposite side of the plane which includes the rotor axes, from the discharge. The casing 34 is provided, as previously noted, with the discharge passage 38, and also with the discharge passage or chamber 37 which is connectible, under the control of the valve 36, with the rotor chambers. If desired, the compressor may have the speed of drive thereof automatically governed as by the mechanism more fully described in my copending application above identified.

Referring now more particularly to Figs. 7, 14 and 15, it will be observed that the casing at the intake side does not fit at all closely to the peripheries of the rotors, and that the arcuate intake grooves 94 extend at the intake end of the supercharger somewhat more than 90° in one case and somewhat less than 90° in the other past the plane which includes the axes of rotation of the rotors, and that there are wall portions respectively marked 102 and 103 which, except for clearances adequate to constitute space packing, do conform or fit quite closely to the cylinders traced by the outermost portion of the rotors, and that these portions 102 and 103 intersect along a line 104 parallel to the rotor axes.

Now the fluid which is "sealed" in the successive progressively diminishing chambers between the rotors and the casing walls would be substantially compressed if no escape or discharge were provided between the times pairs of tooth spaces or grooves move out of communication with the grooves 94 and the instant that the leading edges of the tooth spaces come into communication with the discharge 38; and under certain conditions such compression is very desirable, but under other circumstances, as has been shown, and as will be further shown, it is desirable to avoid material compression, and accordingly I have provided an opening at 35 so related to the length of the casing and the helix angle of the rotors that when the opening 35 is unobstructed no compression of the fluid enclosed between the rotors 30, 31 will take place before communication with the opening 35 is had; and the relationship of the opening 35 to the discharge passage 38 is such that the air remaining in the pockets in the rotors, as these pockets move out of communication with the opening 35, will not be compressed before these same pockets communicate with the discharge 38. It may thus be noted that the positions of the ends of the intake grooves 94 and the position and dimensions of the opening 35 are such that with the helix angles of the rotors used, tooth pockets whose "trailing" edges are just ceasing to communicate with the intake are just about to commence to have their forward edges pass over the opening 35, and that as the "trailing" edges of tooth pockets approach their points of final communication with the opening 35 when the latter is open they have their leading edges pass beyond the edge of the final discharge opening, whereby there is displacement but not compression in sealed pockets, of fluid when the opening 35 is not closed by the valve 36. However, when the valve 36 is closed, there is a substantial compression of the fluid between the time the tooth spaces cease to communicate with the grooves 94, 94 and move into communication with the discharge 38. In Fig. 16 the special conformation of the discharge end plate is shown, whereby the needed extent of the discharge opening 38 is obtained.

The valve 36 is of such shape that when it is closed it conforms very closely to the walls of the bores 32, 33. This valve has ears 107 through which pins 108 pass, and these pins are secured in the arms or flanges 109 carried upon a pivotal support member 110 which is secured by a pivot pin 111 to the wall of the casing 34. A shoulder 112 on the valve and a shoulder 113 on the casing limit the closing movement of the valve 36 to a position in which the walls of the valve conform exactly to the surfaces of the rotor chambers. This valve is adapted normally to be maintained open by a spring 115 engaging at one end the wall of a member 116 which forms a portion of the closure of the discharge chamber 37 and which is secured in any suitable manner to the casing. The other end of the spring acts against a piston 117 movable in a cylindrical chamber 119 which is formed in a cylinder-providing member 120, which is also secured in any suitable manner to the casing, being herein shown as held thereto by machine screws. The piston rod or operating stem 122 with an elongated eye 123 is connected at its outer end to the piston 117, and by means of the eye and a pin 124 is connected to the valve 36. The piston 117 and the member 120 cooperate to form a servo-motor 125 to which fluid may be admitted through a connection or passage 126 under a control shortly to be described; and a leakage port, not shown, and illustrated in my copending application mentioned, is provided to conduct away any liquid which may escape past the piston to an oil sump 130 (Fig. 10) in the lower part of the casing 34. The spring 115 tends normally to maintain the valve 36 open, but when pressure is supplied under certain predetermined conditions to the servo-motor mentioned the piston 117 will be caused, through the operating stem 122 and the pin 124, to close the valve 36, and the supercharger will thus operate substantially precisely as though there were no opening 35 available. Thus, depending upon the position of the valve 36, there is provided in a single unit, in effect, a mere displacement device, and a compressor capable of substantial compression of air taken in, between the moments of intake and discharge. The supercharger casing has, as above stated, in the base thereof a sump 130. A pump of the intermeshing gear type 132 is normally partially submerged, and has its intake always submerged, in the horizontal position of the casing, in the oil in the sump. This pump includes a casing 133 having intersecting rotor chambers 134 therein in which there are rotors 135 whose intermeshing teeth 136 are adapted to transport oil from an intake passage 137 to a discharge space 138 above the plane of the mesh line of the rotors. One of the rotors drives the other and the first mentioned rotor is provided with a shaft 139 which extends through a cover 140 and carries a gear 141 which is in turn driven by a pinion 142 rotatably supported on a sleeve member 143. A larger gear 144, herein shown as formed integrally with the gear 142, is driven by a pinion 145 which is rotatable with the rotor 31. The discharge passage 138 communicates through a manually controlled hollow valve 147 which need not be herein described, but which is described in my above mentioned copending application, and through a strainer 148 with a passage 149 which is connected, as more fully shown in my copending application hereinabove identified, with a transverse passage or chamber 150. The chamber 150 is adapted to be connected, under the control of a spring-loaded valve 151, with a passage 152 which is connected by an annular passage 153 with a further passage 154. The passage 154 has a bore 155 communicating with it, and a suitable spring loaded valve 156 reciprocates in the bore. A side vent 157 opens out of the bore and leads into a space S which is in communication with the sump 130 and which is under external pressure—pressure outside the cabin. The valve 156 is adapted to control the pressure in the passage 154 by controlling the escape of fluid through the side vent. The passage 154 further communicates through a port 158 with a bore 159 of a valve seat member 160 mounted in the passage 161, which is connected by another passage 162 to a passage 163 leading to the servo-motor which controls the position of the valve 36. It will be evident that if escape through the bore 159 is prevented, fluid will be supplied to the servo-motor at a pressure determined by the valve 156. Means is provided whereby the pressure may be freely vented from the bore 159 back to the sump 130 at all times when the airplane is operating at levels where the external pressure is below a predetermined amount, and the valve seat member 160 is provided with a plurality of ports 164 opening through a surface surrounded by an annular valve seat 165, and there is further provided a central guide extension 166. Reciprocably mounted on this guide extension is a valve element 167. Movement of this valve element in an opening direction is limited by a sleeve portion 168 formed on a threaded sleeve member 169 which is supported by a further sleeve mounting element 170 carried by a wall of the casing 34. An adjustable closure element and spring tension regulator 171 engages a spring 172 which acts upon the valve 167 and normally tends to seat it. Connected to the valve 167 and to the sleeve member 169 at opposite sides of the sleeve portion 168 are bellows devices 173 and 174 bounding a chamber 175 in which the sleeve 168 is enclosed, and this sleeve is perforated so that free communication may at all times exist throughout the interior of this chamber. The chamber 175 is evacuated and the compression of the spring 172 is so determined that until the pressure acting upon the exterior of the bellows arrangement falls to a predetermined low value, the valve 167 will be held firmly open against the stop sleeve 168. However, when the pressure in the space S falls below a predetermined value the valve 167 will firmly seat and interrupt the discharge of fluid back to the sump, and cause the building up of such a pressure in the chamber 159 as to close the valve 36 and cause the supercharger to operate as a compressor instead of displacement means. The walls of the element 170 are perforated as at 179, 180 to permit the fluid passing through the passages 164 to flow freely to the sump through the space S. This space is connected to external pressure—pressure outside the cabin— in any suitable manner, as earlier noted. The setting of the spring 172 is such that the valve 167 is normally open at heights of the airplane below say 25,000 feet. The valve 167 is of the overbalanced type, being of the sharp opening variety so that when the valve 36 is to open it may be permitted to open sharply and cleanly. Extending axially through the guide extension 166 is a passage 182 through which fluid passes from the bore 159 to the interiors of the sleeve member 169 and the bellows device 174. When the valve device 167 is unseated fluid supplied under pressure through the passage 182 acts against the outer end of the valve and counteracts the increase in pressure on the inner end of the valve produced by the fluid acting through the ports 164.

*The variable back pressure valve*

The variable back-pressure valve mechanism as previously noted includes a casing 71 in which there is arranged a restricting or back-pressure imposing valve 72 whose position is both manually controllable and automatically controllable. The valve 72 (Fig. 3) is of the approximately balanced type and includes a generally conical portion 190 and an outer, peripheral, generally cylindrical portion 191. The portion 190 is traversed by ports 192 to balance the pressures at opposite sides of the valve. The cylindrical portion 191 has an annular inner flange portion 194 formed thereon carrying pins 195 which are adapted to slide in straight slots 196 formed in a portion 197 of the valve casing. A sleeve portion 198 (see Figs. 3 and 6) has a plurality of elongated generally triangular openings 199 formed therein into which the pins 195 project. The sleeve portion 198 is rotatably mounted within the portion 197 of the casing and may be turned relative to the latter by means of a handle 200. In view of the fact that the hypothenuse of the triangular openings 199 faces downward, it will be evident that rotation of the sleeve 198 may manually cause opening of the valve 72, but it is not possible to close the valve 72 by this control. Thus this manual control can lock the valve 72 out of operation when desired.

The valve 72 is carried by a tubular stem portion 202 and is connected to that stem portion and to a spaced plate 204 by nut and bolt means 205. The stem is guided for reciprocatory motion in a guide structure 206 carried by an inner wall portion 207 forming a part of the valve casing. To this latter portion there is attached a housing element 208 which encloses a bellows device 209 attached in sealing relation at its upper end to the plate device 204, while its lower end is attached in sealed relation to an annular member 210 between which and a hollow inner member 211 a flange upon the housing 208 is clamped. The bellows 209 is continuously subjected through conduit means 212 and a passage 212' to the pressure in the throat of the valve casing 71 at the upper side of a valve seat 213 with which the valve 72 is adapted to cooperate. In other words, the outside of the bellows 209 is subjected to the pressure in the conduit 70. Its interior is subjected to a variable pressure. This variable pressure is determined by the relative rates of admission of pressure to the bellows from the conduit 70 and of discharge of pressure from the bellows. The member 211 supports a domelike enclosure member 214 which houses bellows devices shortly to be described which control the position of a pilot valve 215. Another pilot valve 216 has its position regulated by a spring 217 and a thermostatically expansible operating device 218. Each of the pilot valves 215 and 216 has associated with it a valve seat forming element 219. Each of these elements has an axial passage 219' for which the associated pilot valve is not a snug fit, whereby pressure from the conduit 70 may restrictedly pass along between the pilot valve and the wall of the opening 219'. Each of the valve seat members has a central chamber 220 into which the associated passage 219' opens and which communicates through a passage 221 with passage means 222 which is connected with external pressure through a conduit 223. It will be noted that this same external pressure connection communicates with the interior of the domelike housing member 214. Each of the chambers 220 communicates through a passage 224 with the space inside the bellows 209. The pilot valve 216 has a head 226 against which the spring 217 acts; and a bell crank lever device 227 has one arm thereof 228 positioned to act on the head 226. The other arm 229 of the bell crank is engaged by a spring pressed plunger 230 actuated by a spring 231 whose compression is variable by means of a follower 232. Were there nothing else to oppose the forces exerted on the arm 229 by the spring pressed plunger 230 the pilot valve 216 would normally be closed; and this would mean that the pressure within the bellows 209 would build up, by reason of the flow of pressure along the stem of the valve 216 and through the chamber 220 and lower passage 224 in Fig. 3 into the bellows. This would mean that the valve 72 would close, and accordingly the back pressure imposed on the supercharger would build up, which would mean that the air would be increased substantially in temperature before its admission to the cabin. The temperature responsive bellows 218 has an end portion 234 which acts on the opposite side of the bell crank lever arm 229 and tends to move it in opposition to the spring 231 and the bellows 218 is connected by a tube 235 to a gas filled, bulb type thermostatic device 236 in the cabin, so that when the cabin temperature increases the bellows 218 will be expanded and the bell crank 227 moved in opposition to the action of the spring 231 to permit the spring 217 to open the pilot valve 216 and thus permit an opening movement of the back pressure imposing valve 72. The mountings for the spring pressed plunger 230 and for the operating device 218 are supported by an end closure element 237 which completes the enclosure of the space 238 with which the conduit 212 communicates.

From what has been said, it will be apparent that whenever the cabin temperature tends to become undesirably low the pilot valve 216 will be moved in a direction to effect closing of the back pressure valve 72, with a resulting additional heating of the air entering the cabin. When the cabin tends to get undesirably warm the back pressure on the supercharger will be reduced, so that the air entering the cabin will not be heated so much, thereby giving the cabin a chance to cool.

As it is desirable that there shall, under no circumstances, be exceeded a predetermined maximum differential between supercharger back pressure and external pressure, and that also there shall be no exceeding of a predetermined maximum desired ratio between supercharger discharge and intake pressures, I have provided appropriate controlling means for the pilot valve 215 to attain these ends. The pilot valve 215 is herein governed by the following devices. An annular member 240, somewhat T-shaped in radial cross section, is mounted upon the member 211 at the upper end of the latter. The member 240 includes a cylindrical stop portion 241, an outer flange portion 242 and an inner flange portion 243. Suitable bellows devices 244 and 245 are brazed, or otherwise held, at their lower ends, to the flanges 242 and 243, and at their upper ends these devices are secured to an annular member 246. The space between these bellows is evacuated, and the member 246 includes an end flange 247 to which the end of the bellows 244 is secured, a cylindrical portion 248 and a second radially but inwardly extending flange portion 249. To this latter portion is secured the bellows device 245. The radial flange 247 is adapted, in the relatively collapsed condition of the bellows, to engage the end of the stop portion 241. The upper end of the sleeve portion 248 carries an annular support member 251 within which there is mounted a circular plate 252 carrying a guide sleeve portion 253. Slidably mounted within the guide sleeve 253 is a stem 254 having at its lower end a socket 255 in which the pilot valve element 215 is mounted with a limited freedom of movement laterally. The holding arrangement for this pilot valve is illustrated in detail in my copending application, Serial No. 472,567, filed January 16, 1943. The stem 254 has between its ends, and in the construction shown, approximately midway between its ends, a radial flange 257. This flange has a seating surface 258 which is adapted to engage a surface 259 on the upper side of the flange portion 249 of the member 246. A shallow radial groove 260 in the peripheral portion of the flange 257 maintains communication between the space between the bellows 245 and the lower end of the stem 254 and the space enclosed by the sleevelike portion 248 of the member 246, even when the surfaces 258 and 259 are in contact. Between the member 251 and the flange 257 there extends a suitable bellows device 261 suitably connected in sealed relation to the flange and to the member, and a spring 262 of appropriate strength acts upon the flange and upon the plate 252 and tends to move the stem 254 in a direction to cause the pilot valve 215 to seat. It will be observed that the plate 252 is traversed by one or more openings 263 so that the interior of the bellows device 261 is in constant communication with external pressure through the interior of the casing 214 and the passage 223.

As previously noted, the space within the bellows device 261 is continuously connected with external pressure; and the space below the flange 257 and also that surrounding the bellows device 261 is subjected to the pressure from within the conduit 70 at all times. The spring 262 is so proportioned that its pressure on the flange 257 is just equal to the difference between supercharger discharge pressure and external pressure applied to the effective area of the bellows device 261 when the maximum desired pressure differential between supercharger intake and discharge pressure is reached.

The maximum desired pressure differential between supercharger intake and discharge pressure may well be the same as the maximum desired pressure differential between external pressure and cabin pressure, and as the maximum desired pressure differential between cabin pressure and external pressure may be assumed to be that of the difference in absolute pressure at a height of 10,000 feet and the absolute pressure at 30,000 feet, respectively 20.58 inches of mercury and 8.87 inches of mercury, the control device last described may advantageously be so constructed that when a difference in pressure equal to approximately 11.71 inches of mercury develops, the pilot valve 215 will open and by venting pressure from within the bellows 209 will reduce the back pressure on the supercharger. The desirability of having the same maximum pressure differential established for the control of the pilot valve 215 which exists in connection with the cabin vent valve which will shortly be described in detail, will be apparent when it is considered that when the aircraft is operating with the control for the valve 72 rendered inoperative and with this valve held wide open, the maximum pressure differential which will be imposed on the supercharger under the control of the cabin vent valve will then be the same as can be imposed by the automatic control for the back pressure valve. Of course, it will be understood that the maximum pressure differential between supercharger intake and discharge may be attained at much lower altitudes, by reason of the operation of the thermostatic control for the valve 72, than would occur were this back pressure imposing arrangement not present.

It is also desirable that the same maximum pressure ratio limitation be imposed on the valve 72 that is imposed by the cabin pressure vent valve later described. For, just as it is important that the cabin vent valve shall be operative at heights, for example above 40,000 feet, to limit the maximum pressure ratio between cabin pressure and external pressure (supercharger discharge pressure and supercharger intake pressure when the valve 72 is wide open), so it is important that the supercharger shall not be overloaded by permitting the imposition of back pressures in excess of cabin pressure on the supercharger great enough to establish compression ratios in excess of the desired limit when the plane is flying at lower altitudes. When the aircraft is at a height of 40,000 feet, the external pressure will have fallen to a value of approximately 5.54 inches of mercury while the cabin pressure will still be equal to approximately 5.54+11.71, or about 17.25 inches of mercury. There will therefore be approximately a compression ratio of something more than three to one necessary to raise outside air at 40,000 feet to cabin pressure. If it is desired to prevent this compression ratio being exceeded when the plane goes above 40,000 feet, it is also desirable to prevent that compression ratio being exceeded when the plane is below 40,000 feet, and it will be obvious that it would be easily possible to exceed such a ratio at much lower heights by placing back pressure on the supercharger discharge.

In view of the presence of the groove 260, the pressure in the conduit 70 acts upon a constant area, regardless of whether the surfaces 258 and 259 are in contact with each other, in a direction to move the members 246, 251 etc. in a direction to open the valve 215, and external pressure acts on a larger but constant area tending to move the members 246, 251 etc. in a direction to close the valve 215. The two areas mentioned respectively exposed to supercharger back pressure and to external pressure are desirably so determined that their ratio to each other will be the same as the ratio of external pressure to cabin pressure at the chosen height of 40,000 feet, namely 5.54 to 17.25. Accordingly, as soon as this ratio between the pressure in the conduit 70 and external pressure is attained, at whatever height it be attained, the valve 215 will be unseated and the imposition of additional back pressure on the supercharger will be prevented. It will be noted that except as the same may be open to prevent the imposition of an undesired maximum differential in pressure between intake and discharge pressures on the supercharger, or the exceeding of a maximum compression ratio between supercharger intake and discharge pressures, the valve 215 will remain closed and thus the cabin temperature, through the governing of the position of the pilot valve 216, will maintain the primary control on the supercharger discharge, but the amount of air that can be bled past this valve when it is open, through its respective passage 224 into the bellows 209, will not be sufficient to prevent the opening of the valve 72 when the pilot valve 215 establishes a connection between its associated passage 224 and the atmospheric connection 223.

*The cabin pressure vent valve*

While any suitable device may be provided for regulating the cabin pressure, I have chosen, for purposes of illustration, a device which is fully disclosed in my copending application Ser. No. 468,938, filed December 14, 1942, and which is claimed therein. This device is adapted to permit the cabin pressure to fall off at substantially the same rate that external pressure falls until the aircraft reaches a desired elevation, such as 8000 or 10,000 feet. Thereafter, this device is adapted, until a considerably greater height is reached, say 30,000 feet, to maintain the cabin pressure relatively constant at whatever pressure prevails at the height at which the following of external pressure by cabin pressure ceases to be desired. When the aircraft goes above the height of 30,000 feet, this device will operate, over perhaps another 10,000 feet of increase in elevation, to reduce the cabin pressure as elevation increases in such a manner that there will be maintained a constant pressure differential between cabin pressure and outside pressure. And if the aircraft is to operate above 40,000 feet, for example, then the nature of the control will be changed so that there will be maintained a constant ratio between cabin pressure and outside pressure from 40,000 feet on up.

This device will not be described in complete detail here in view of its full disclosure in the copending application, but it will suffice to point out that it includes a valve 263 (Fig. 17) of the approximately balanced type whose position is adjusted and determined by a bellows device 264, one end of which is fixed, as at 265, and whose other end is connected through an inner closure plate 266 and a stem 267, to the valve 263. The valve 263 is movable relative to a stationary seat 268 and controls the flow from the interior of the cabin through a screen 269 and passages 270 to a conduit 271 which is connected through any suitable connection 272, preferably terminating, say, at the rear of a wing of the aircraft, with external pressure. The pressure within the bellows 264 is controlled by a pair of pilot valves 273 and 274. Each of these is designed to control the connection of the interior of the bellows 264, through suitable passages 275 opening into the interior of the bellows, chambers 276 into which the pilot valves extend, ports 277 controlled by the pilot valves, a chamber 278 and conduit means 279 which leads into the passage 271, with external pressure. Each of the valves has clearance about it so that cabin pressure may pass along the stem portions of the valves and pass either into the interior of the bellows or to the exterior of the cabin, depending upon the positions of the valves. The valve 273 is controlled by an evacuated bellows 280 with which a spring 281 coacts. Appropriate means, generally designated 282, and including an internal thread 283 on a manually adjustable element 284 and pins 285 carried by a spring follower 286, is arranged to vary the degree of compression of the spring 281 and thereby to raise or lower the point at which cabin pressure will become insufficient to maintain the evacuated bellows 280 collapsed against the expanding force exerted thereon by the spring 281. As long as the cabin pressure is great enough to maintain the evacuated bellows 280 collapsed, the valve 263 will be maintained open in such a manner that cabin pressure will fall off substantially at the same rate that external pressure falls off. When, however, the predetermined height of 8000 or 10,000 feet, or whatever may be selected, is attained, the cabin pressure will have diminished sufficiently so that the spring 281 will be able to expand the bellows and move the valve 273 to its seat. This will result in a partial closure of the cabin vent valve 263, and cabin pressure will thereupon tend to rise, with a resultant action on the evacuated bellows which will bring about such a control of the valve 263 that, until a predetermined higher elevation, such as 30,000 feet is reached, the valve 263 will have its position adjusted to keep the cabin pressure substantially constant. When this desired higher altitude is attained, the pilot valve 274 takes over control, and this pilot valve is governed, as more fully explained in my copending application Ser. No. 468,938, by a pair of controls. From 30,000 to 40,000 feet, the control is by a bellows device 290 whose outer end is mounted on a plate 291 which is carried by other bellows devices which I shall shortly describe. A spring 292 constantly tends to maintain the bellows 290 expanded and to seat the pilot valve 274. The exterior of this bellows device, and its upper end formed by a flange 293 on the stem 294 carrying the pilot valve 274, are constantly subjected to cabin pressure, while the interior of the bellows is in communication through one or more ports 295 and the space within a bellows casing 296 and the conduit means 279 with external pressure. The plate 293 has a groove in its face at 297, so that even when the plate 293 is engaging a surface 298 which is movable with the other bellows devices shortly to be described, there is communication between the interior of the cabin and the space surrounding the bellows 290. It will therefore be evident that when the aircraft attains to the predetermined desired height, say 30,000 feet, the reduction of the pressure within the bellows 290, by reason of the venting of pressure therefrom via the ports 295, will enable cabin pressure acting on the outside of the bellows to overcome the spring 292 and cause the pilot valve 274 to open, thus venting pressure from within the bellows 264 and permitting a partial opening of the valve 263 so that the cabin pressure will again commence to fall. The parts just described will then function to maintain a constant pressure differential between cabin pressure and external pressure until a higher elevation still is reached, at which time the other control of the valve 274 will take over. This other control includes a pair of bellows devices 300 and 301 whose upper ends in Fig. 17 are connected to a stationary annular member 302 and whose lower ends are connected to the support for the plate 291 and to an integrally connected support 304 connected with the first mentioned support by a sleeve portion 305. The space between these bellows is evacuated, and, as will be observed, a larger exterior area is exposed to external pressure, while a smaller interior area is exposed to cabin pressure, and the ratio of these two areas may be the same as the desired ratio between external pressure and cabin pressure at the chosen height of 40,000 feet. Accordingly, as soon as this height is exceeded, the valve 274 will be unseated, and as long as the aircraft operates at heights above 40,000 feet, the control of cabin pressure will be regulated by this valve under the control of the evacuated bellows 300, 301; and a constant ratio between cabin and external pressure will be maintained; and the actual differential between cabin and external pressure will become less than existed at the elevation of 40,000 feet; wherefore, the surface 298 will continuously engage the flange 293 and the whole control will be by the composite bellows 300, 301, until the aircraft again moves below 40,000 feet.

From the foregoing description, the mode of operation of the illustrative embodiments of the different aspects of the invention will be readily followed.

The aircraft may be assumed to be on the ground awaiting takeoff. The supercharger is operating with its unloading valve open and the air will be displaced from the rotor pockets substantially without compression through the unloader port until the pockets move out of communication with the latter. This air will be delivered through the conduit 48 to the valve casing 49, and then pass through the conduit 54 back to the outside air or pass through the conduit 51 into the outer course of the heat exchanger 42 and then to the outside air, the distribution between these two possible travels being determined by the position of the valve 50 which is governed by cabin temperature. When the cabin is relatively warm this air will pass largely through the heat exchanger; when the cabin is cool and cooling of the cabin pressurizing air is not desired, the valve 50 will direct the flow so that relatively little or no air will pass through the outer course of the heat exchanger. Below pressurizing levels little heat exchange will occur as there will be a pressure in conduit 39 only a few inches of water higher than in the conduit 48, but between the height at which the valve 78 commences to operate and the height at which valve 36 closes, considerable heat exchange will be possible.

Air will be delivered from the main discharge of the supercharger through the conduit 39, 40 to the inner pass of the heat exchanger 42 and thence to the conduit 70 whose communication with the cabin is controlled by the back pressure imposing valve 72. When the cabin is relatively warm, the valve element 72 will stand nearly full open, whereby there will be little or no back pressure placed upon the flow through the conduit 70, while, if the cabin is relatively cool the valve 72 will be relatively close to its seat and there will be imposed on the discharge of the supercharger a back pressure such as to increase the temperature of the air entering the heat exchanger and passing through the latter to the cabin.

As will be apparent, the position of the valve 72 will be controlled by the gas-filled bulb-type thermostatic device 236, the valve 72 being caused to close as cabin temperature drops and to open more as cabin temperature rises. However, the automatic controls previously described preclude the existence of a pressure differential between external and supercharger discharge pressure which would overload the supercharger—this control of primary importance at ground level, or the existence of a ratio between intake and discharge (or back) pressure in excess of the value which the design of the supercharger is adapted for—this control more particularly effective at higher levels of flight.

The manner in which the controls operate will be readily followed, since it will be recalled that the back pressure control valve operating bellows 209 is subjected externally to supercharger discharge pressure while its interior is subjected under control of the pilot devices described, to discharge pressure leaking past the pilot valves or to a lower pressure produced when the interior of the bellows is connected to the outside of the cabin upon opening of the pilot valves.

If the cabin is not warm enough as the aircraft stands awaiting takeoff, the gas in the cabin thermostat bulb 236 will exert a reduced pressure on the expansible device 218 and the bell crank lever 227 will be swung in a direction to seat the pilot valve 216, interrupting communication between the interior of the operating bellows for the valve 72 and the outside of the cabin, and permitting supercharger discharge pressure entering the bellows 209 to move the back pressure control valve 72 in a closing direction. The result of this closing movement of this control valve is to impose a back pressure on the supercharger discharge, with the result that the supercharger is forced to work through a compression ratio greater than unity, and the discharge temperature is therefore higher. As previously explained this increase in discharge temperature may be as much as 65° F. if the back pressure is increased to the limit for which the particular device described is designed, even at sea level. When the air so increased in temperature passes the restricting or back pressure valve 72 it expands back down to cabin pressure, and this expansion of the air reduces its temperature and increases its velocity, and, neglecting the practically speaking negligible factor of the Joule-Thompson effect, the mechanical equivalent of the heat lost due to expansion is equal to the increase in kinetic energy. As the velocity of the air is reduced by turbulence, the kinetic energy is transformed back into heat, so that the final temperature of the air entering the cabin is almost the same as it was when it reached the restricting valve 72.

If the pilot valve 216 remains in its closed position so long that the valve 72 tends to build up a back pressure so great that the differential between intake and discharge pressure reaches the value beyond which it is considered undesirable to load the supercharger system, the spring loaded bellows device 261, which is subjected internally to external pressure and on its exterior to supercharger discharge pressure will move the pilot valve 215 to a position to vent pressure from within the actuating bellows 209 for the valve 72 and cause the latter to cease its closing movement and tend to move in the opposite direction, thereby preventing further loading of the supercharger.

When the aircraft reaches say 20,000 feet, the unloading valve closes and the supercharger then operates as a positive compressor, but the reduced volume of air taken in precludes overloading of the mechanism. As the cabin vent valve is holding cabin pressure at a value of say 8,000 feet at this time, there is no danger of the permissible maximum ratio of compression being exceeded. When the aircraft reaches an elevation of 40,000 feet, in the case of certain designs of the preferred type of supercharger herein illustrated, it is desirable, and at considerably lower heights in the case of present centrifugal superchargers, it is imperative, to prevent the range of compression increasing further, and the evacuated bellows control 244, 245, responsive on different areas to supercharger discharge and to intake pressures is of course designed for the particular equipment with which it is to be used. Accordingly, when the ratio of discharge pressure gets, with respect to the falling (with height) intake pressure to the desired maximum, the pilot valve 215 will be moved to open the valve 72 and prevent an excessive range of compression being imposed on the supercharger. Of course, it will be understood that the automatic cabin vent valve 263 will function to prevent cabin pressure exceeding the same ratio, and the supercharger discharge will be at the same pressure as cabin pressure at heights above the level at which the constant ratio control of valve 72 becomes effective. Of course at this time the supercharger is delivering the discharge air at as high a temperature as possible, so that the inaction of the valve 72 is immaterial.

It will be understood that at starting the operator can render the back pressure imposing valve 72 ineffective by suitably turning the ring 198 by means of the handle 200.

While I have in this application specifically described certain embodiments which my invention may assume in practice from its system and valve mechanism aspects, it will be understood that these embodiments have been shown for purposes of illustration only and that the invention in its different aspects may be modified and embodied in various other forms without departing from its spirit or the scope of the appended claims.

What I claim as new and desire to secure by Letters Patent is:

1. In combination, means forming a chamber, a supercharger having a terminal discharge port and an intermediate discharge port and having means governed by intake pressure for closing said intermediate discharge port and causing an increase in terminal discharge pressure, a heat exchanger having plural passages, means for connecting the terminal discharge port to one end of one of said passages, means for connecting said passage at its other end to said chamber forming means, a variable back pressure valve controlling the delivery through said passage to said chamber, means for connecting one end of another passage of said heat exchanger to atmosphere, means for connecting said intermediate discharge port to the other end of said second passage including a valve casing having also a connection with atmosphere, and a valve adjustable to vary inversely the connections between said intermediate discharge port and said second passage and the atmosphere respectively.

2. In a variable back pressure valve, a casing having a throat through which pressure is admitted to the casing and a volute leading to a discharge connection and a valve seat between said throat and said volute, a valve movable relative to said valve seat, valve moving means including a pressure actuated wall operatively connected to said valve, means for subjecting one side of said wall continuously to the pressure conditions in said throat, a plurality of continuously open, restricted connections between the throat of said valve casing and the other side of said wall, temperature responsive means, and means controlled thereby for effecting a controlled connection between the last mentioned side of said wall and a point under external pressure, and differential pressure responsive means and means controlled thereby for effecting another controlled connection of the last mentioned side of said wall with a point under external pressure, said controlled connections being independent of each other.

3. In a valve mechanism for controlling conditions in an aircraft cabin, in combination, an inlet opening, a valve for controlling the flow of fluid through said inlet opening, pressure responsive means including a member having oppositely directed pressure areas for controlling the position of said valve relative to said inlet opening, means for subjecting one of said pressure areas continuously to the pressure conditions at the supply side of said inlet opening, means for connecting an opposite pressure area in restricted communication with the space at the supply side of said inlet opening irrespective of the position of said valve, separate passage means for connecting said last mentioned pressure area in communication with ambient pressure, a plurality of valves, one for each of said passage means, for controlling the flow of fluid through said passage means, temperature responsive means for controlling one of said last mentioned valves, and pressure responsive means for controlling another of said last mentioned valves including means for preventing the exceeding of a desired maximum ratio between the pressure at the supply side of said inlet opening and ambient pressure.

4. In a valve mechanism, in combination, an inlet opening, a valve for controlling the flow of fluid through said inlet opening, pressure responsive means having oppositely directed pressure areas for controlling the position of said valve relative to said inlet opening, means for subjecting one of said pressure areas continuously to the pressure conditions at the supply side of said inlet opening, means for connecting an opposite pressure area in restricted communication with the space at the supply side of said inlet opening, separate passage means for connecting said last mentioned pressure area in communication with a space containing fluid at a pressure below that at the supply side of said inlet opening, a plurality of valves, one for each of said passage means, for controlling the flow of fluid through said passage means, temperature responsive means operative on an increase in temperature above a predetermined maximum value in a space at the discharge side of said inlet opening for effecting an opening of one of said valves, and pressure responsive means operative on a predetermined maximum pressure differential between the pressures at the supply side of said inlet opening and in said space containing fluid at a pressure below that at said inlet opening for effecting an opening of another of said last mentioned valves.

5. In a valve mechanism, in combination, an inlet opening, a valve for controlling the flow of fluid through said inlet opening, pressure responsive means having oppositely directed pressure areas for controlling the position of said valve relative to said inlet opening, means for subjecting one of said pressure areas continuously to the pressure conditions at the supply side of said inlet opening, means for connecting an opposite pressure area in restricted communication with the space at the supply side of said inlet opening, passage means arranged in parallel for connecting said last mentioned pressure area in communication with a space containing fluid at a pressure below that at the supply side of said inlet opening, a plurality of valves, one for each of said passage means, for controlling the flow of fluid through said passage means, means responsive to temperature at the discharge side of said opening for controlling one of said last mentioned valves, and means responsive to pressure differentials between the pressures at the supply side of said inlet opening and in said space containing fluid at a pressure below that at said inlet opening for controlling another of said last mentioned valves.

6. In combination, in a cabin temperature controlling system, a cabin, a supercharger, means for connecting the supercharger discharge to said cabin, a valve movable to impose a variable back pressure in said supercharger discharge connection, pressure responsive means having oppositely directed pressure areas for controlling the position of said valve, means for subjecting one of said pressure areas continuously to the pressure conditions in said discharge connection, means for connecting an opposite pressure area in restricted communication with said discharge connection, passage means for connecting said last mentioned pressure area in communication with the exterior of said cabin, valve means for controlling the flow of fluid through said passage means, and means responsive to the temperatures in said cabin for controlling said valve means.

7. In combination, in a cabin temperature controlling system, a cabin, a supercharger, means for connecting the supercharger discharge to said cabin, a valve movable to impose a variable back pressure in said supercharger discharge connection, pressure responsive means having oppositely directed pressure areas for controlling the position of said valve, means for subjecting one of said pressure areas continuously to the pressure conditions in said discharge connection, means for connecting an opposite pressure area in restricted communication with said discharge connection, passage means for connecting said last mentioned pressure area in communication with the exterior of said cabin, valve means for controlling the flow of fluid through said passage means, and means responsive to the temperatures in said cabin for controlling said valve means, said temperature responsive means operating on an increase in cabin temperature above a predetermined maximum for effecting an opening of said valve means.

8. In combination, in a cabin temperature controlling system, a cabin, a supercharger, means for connecting the supercharger discharge to said cabin, a valve movable to impose a variable back pressure in said supercharger discharge connection, pressure responsive means having oppositely directed pressure areas for controlling the position of said valve, means for subjecting one of said pressure areas continuously to the pressure conditions in said discharge connection, means for connecting an opposite pressure area in restricted communication with said discharge connection, passage means for connecting said last mentioned pressure area in communication with the exterior of said cabin, a valve for controlling the flow of fluid through said passage means, means for yieldably urging said last mentioned valve toward an open position, and means including a device responsive to the temperature in said cabin and operative on a decrease in cabin temperature below a predetermined value for effecting a closure of said last mentioned valve.

9. In combination, in a cabin temperature controlling system, a cabin, a supercharger, means for connecting the supercharger discharge to said cabin, a valve movable to impose a variable back pressure in said supercharger discharge connection, pressure responsive means having oppositely directed pressure areas for controlling the position of said valve, means for subjecting one of saiad pressure areas continuously to the pressure conditions in said discharge connection, means for connecting an opposite pressure area in restricted communication with said discharge connection, passage means for connecting said last mentioned pressure area in communication with the exterior of said cabin, a plurality of valves for controlling the flow of fluid through said passage means, means responsive to the temperatures in said cabin for controlling one of said last mentioned valves, and means responsive to the pressure differentials between said discharge connection and the exterior of said cabin for controlling another of said last mentioned valves.

10. In combination, in a cabin temperature controlling system, a cabin, a supercharger, means for connecting the supercharger discharge to said cabin, a valve movable to impose a variable back pressure in said supercharger discharge connection, pressure responsive means having oppositely directed pressure areas for controlling the position of said valve, means for subjecting one of said pressure areas continuously to the pressure conditions in said discharge connection, means for connecting an opposite pressure area in restricted communication with said discharge connection, passage means for connecting said last mentioned pressure area in communication with the exterior of said cabin, a plurality of valves arranged in parallel for controlling the flow of fluid through said passage means, means responsive to temperatures in said cabin for effecting an opening of one of said last mentioned valves when the cabin temperature goes above a predetermined value, and pressure responsive means operative on an increase in the pressure differential between said discharge connection and the exterior of said cabin for effecting an opening of another of said last mentioned valves.

11. In combination, in a cabin temperature controlling system, a cabin, a supercharger, means for connecting the supercharger discharge to said cabin, a valve movable to impose a variable back pressure in said supercharger discharge connection, pressure responsive means having a pressure area against which pressure acts to urge said valve in an opening direction, means for subjecting said pressure area continuously to the pressure conditions in said discharge connection, said pressure responsive means having another pressure area against which pressure acts to urge said valve in a closing direction, means for connecting said last mentioned pressure area in restricted communication with said discharge connection, passage means for connecting said last mentioned pressure area in communication with the exterior of said cabin, valve means for controlling the flow of fluid through said passage means, and means responsive to the temperature in said cabin for controlling said valve means.

12. In combination, in a cabin temperature controlling system, a cabin, a supercharger, means for connecting the supercharger discharge to said cabin, a valve movable to impose a variable back pressure in said supercharger discharge connection, pressure responsive means having a pressure area against which pressure acts to urge said valve in an opening direction, means for subjecting said pressure area continuously to the pressure conditions in said discharge connection, said pressure responsive means having another pressure area against which pressure acts to urge said valve in a closing direction, means for connecting said last mentioned pressure area in restricted communication with said discharge connection, passage means for connecting said last mentioned pressure area in communication with the exterior of said cabin, valve means for controlling the flow of fluid through said passage means, and means responsive to the temperature in said cabin for controlling said valve means, said temperature responsive means operating on an increase in cabin temperature above a predetermined maximum for effecting an opening of said valve means.

13. In combination, in a cabin temperature controlling system, a cabin, a supercharger, means for connecting the supercharger discharge to said cabin, a valve movable to impose a variable back pressure in said supercharger discharge connection, pressure responsive means having a pressure area against which pressure acts to urge said valve in an opening direction, means for subjecting said pressure area continuously to the pressure conditions in said discharge connection, said pressure responsive means having another pressure area against which pressure acts to urge said valve in a closing direction, means for connecting said last mentioned pressure area in restricted communication with said discharge connection, passage means for connecting said last mentioned pressure area in communication with the exterior of said cabin, a plurality of valves arranged in parallel for controlling the flow of fluid through said passage means, means responsive to temperatures in said cabin for effecting an opening of one of said last mentioned valves when the cabin temperature goes above a predetermined value, and pressure responsive means operative on predetermined increase in the pressure differential between said discharge connection and the exterior of said cabin for effecting an opening of another of said last mentioned valves.

14. In combination, in a cabin temperature controlling system, a cabin, a supercharger, means for connecting the supercharger discharge to said cabin, a valve movable to impose a variable back pressure on said supercharger, an expansible chamber device for controlling the position of said valve including a movable wall, means for subjecting said wall continuously on one side to said supercharger discharge pressure, and means including a control device governed by cabin temperature for subjecting said wall on its other side intermittently to said supercharger discharge pressure and to the pressure at the exterior of said cabin.

15. In combination, in a cabin temperature controlling system, a cabin, a supercharger having a terminal discharge port and in intermediate discharge port, a heat exchanger having two fluid conducting passes, means for connecting the terminal discharge port to one end of one of said passes, means for connecting said pass at its other end to said cabin, a variable back pressure valve for controlling fluid flow through said pass to said cabin, means responsive to cabin temperatures for controlling said back pressure valve, passage means for connecting said intermediate discharge port to one end of the other of said passes and to the exterior of said cabin, valve means responsive to cabin temperatures for controlling communication through said passage means, and means for connecting the other end of said last mentioned pass in communication with the exterior of said cabin.

16. In combination, in a cabin temperature controlling system, a cabin, a supercharger having a terminal discharge port and an intermediate discharge port, a heat exchanger having two fluid conducting passes, means for connecting the terminal discharge port to one end of one of said passes, means for connecting said pass at its other end to said cabin, a variable back pressure valve for controlling fluid flow through said pass to said cabin, means responsive to cabin temperatures for controlling said back pressure valve, passage means for connecting said intermediate discharge port to one end of the other of said passes and to the exterior of said cabin, valve means responsive to cabin temperatures for controlling communication through said passage means, said last mentioned valve means operative to cut off communication between said intermediate discharge and the exterior of said cabin when the cabin temperatures are above a predetermined value, and means for connecting the other end of said last mentioned pass in communication with the exterior of said cabin.

17. In combination, in a cabin temperature controlling system, a cabin, a supercharger having a terminal discharge port and an intermediate discharge port, a heat exchanger having two fluid conducting passes, means for connecting the terminal discharge port to one end of one of said passes, means for connecting said pass at its other end to said cabin, a variable back pressure valve for controlling fluid flow through said pass to said cabin, means responsive to cabin temperatures for controlling said back pressure valve, passage means for connecting said intermediate discharge port to one end of the other of said passes and to the exterior of said cabin, valve means responsive to cabin temperatures for controlling communication through said passage means, said last mentioned valve means operative to cut off communication between said intermediate discharge port and said heat exchanger when the cabin temperatures drop below a predetermined value, and means for connecting the other end of said last mentioned pass in communication with the exterior of said cabin.

18. In combination, in a cabin temperature controlling system, a cabin, a supercharger having a terminal discharge port and an intermediate discharge port, a heat exchanger having two fluid conducting passes, means for connecting the terminal discharge port to one end of one of said passes, means for connecting said pass at its other end to said cabin, a variable back pressure valve for controlling fluid flow through said pass to said cabin, means responsive to cabin temperatures for controlling said back pressure valve, passage means for connecting said intermediate discharge port to one end of the other of said passes and to the exterior of said cabin, valve means responsive to cabin temperatures for controlling communication through said passage means, said last mentioned valve means operative to vary the communication between said intermediate discharge port and said last mentioned pass directly with increase in cabin temperatures and to vary the communication between said intermediate discharge port and the cabin exterior inversely with increase in cabin temperatures, and means for connecting the other end of said last mentioned pass in communication with the exterior of said cabin.

19. In combination, a cabin, a supercharger having intermediate and terminal discharge ports, a heat exchanger having passages out of communication with each other, means for connecting said terminal discharge port with the cabin through one of said passages, means for connecting said intermediate discharge port either directly or through another of said passages, with the atmosphere, thermostatic control means governed by cabin temperature for controlling said last mentioned means, and means for maintaining cabin pressure higher than external pressure when said cabin is above a predetermined altitude.

20. In combination, a cabin, a supercharger having intermediate and terminal discharge ports, a heat exchanger having passages out of communication with each other, means for connecting said terminal discharge port with the cabin through one of said passages, means for connecting said intermediate discharge port either directly or through another of said passages with the atmosphere, thermostatic control means governed by cabin temperature for said last mentioned means, altitude responsive means for closing said intermediate discharge port when said cabin reaches a predetermined altitude, and means for maintaining cabin pressure higher than external pressure when said cabin is above a predetermined altitude.

21. In combination, a cabin, a supercharger having intermediate and terminal discharge ports, a heat exchanger having passages out of communication with each other, means for connecting said terminal discharge port with the cabin through one of said passages, means for connecting said intermediate discharge port either directly or through another of said passages with the atmosphere, thermostatic control means governed by cabin temperature for said last mentioned means, altitude responsive means for closing said intermediate discharge port when said cabin reaches a predetermined altitude, means for maintaining cabin pressure higher than external pressure when said cabin is above a predetermined altitude, and means for subjecting the flow from said terminal port to a back pressure, said last mentioned means including control means responsive to cabin temperature.

22. In combination, a cabin, a supercharger having intermediate and terminal discharge ports, a heat exchanger having passages out of communication with each other, means for connecting said terminal discharge port with the cabin through one of said passages, means for connecting said intermediate discharge port either directly or through another of said passages with the atmosphere, thermostatic control means governed by cabin temperature for controlling said last mentioned means, altitude responsive means for closing said intermediate discharge port when said cabin reaches a predetermined altitude, means for maintaining cabin pressure higher than external pressure when said cabin is above a predetermined altitude, and means including both cabin temperature and pressure responsive control means for subjecting the flow from said terminal port to a back pressure.

23. In a cabin temperature controlling system, in combination, a cabin, a supercharger, means for connecting the supercharger discharge to said cabin, a valve movable to impose a variable back pressure on said supercharger, and controlling means for said valve including devices respectively responsive to cabin temperatures and successively to the differential between supercharger discharge pressure and the pressure at the exterior of the cabin and to the ratio between supercharger discharge pressure and the pressure at the exterior of the cabin.

24. In a cabin temperature controlling system, in combination, a cabin, a supercharger, means for connecting the supercharger discharge to said cabin, a valve movable to impose a variable back pressure on said supercharger, pressure responsive means having oppositely directed pressure areas for controlling the position of said valve and operative when the pressures on said areas are equal to close said valve, means for subjecting one of said pressure areas continuously to the pressure conditions in said discharge connection, means for connecting an opposite pressure area in restricted communication with said discharge connection, passage means for connecting said last mentioned pressure area in communication with the exterior of said cabin, a plurality of valves for controlling the flow or fluid through said passage means, means responsive to the temperatures in said cabin for controlling one of said last mentioned valves, and means responsive to the pressures in said discharge connection and at the exterior of said cabin for controlling another of said last mentioned valves.

25. In a cabin temperature controlling system, in combination, a cabin, a supercharger, means for connecting the supercharger discharge to said cabin, a valve movable to impose a variable back pressure on said supercharger, pressure responsive means operating normally to close said valve and having a pressure area against which pressure acts to urge said valve in an opening direction, means for subjecting said area continuously to the pressure conditions in said discharge connection, said pressure responsive means having another pressure area against which pressure acts to urge said valve in a closing direction, means for connecting said last mentioned pressure area in restricted communication with said discharge connection, passage means for connecting said last mentioned pressure area in communication with the exterior of said cabin, a plurality of valves arranged in parallel for controlling the flow of fluid through said passage means, means responsive to cabin temperatures for controlling one of said last mentioned valves, and means responsive to the pressures in said discharge connection and at the exterior of said cabin for controlling another of said last mentioned valves.

26. In a cabin temperature controlling system, in combination, a cabin, a supercharger, means for connecting the supercharger discharge to said cabin, a valve movable to impose a variable back pressure on said supercharger, pressure responsive means operating normally to close said valve and having a pressure area against which pressure acts to urge said valve in an opening direction, means for subjecting said area continuously to the pressure conditions in said discharge connection, said pressure responsive means having another pressure area against which pressure acts to urge said valve in a closing direction, means for connecting said last mentioned pressure area in restricted communication with said discharge connection, passage means for connecting said last mentioned pressure area in communication with the exterior of said cabin, a pair of valves arranged in parallel for controlling the flow of fluid through said passage means, means responsive to cabin temperatures for controlling one of said last mentioned valves, and a plurality of pressure responsive means for controlling the other of said last mentioned valves, one of said plurality of pressure responsive means responding to the differentials between the pressures in said discharge connection and at the exterior of said cabin and operating to prevent the exceeding of a predetermined differential between said pressures and another of said pressure responsive means responding to the differentials between the pressures in said discharge connection and at the exterior of said cabin and operating to prevent the exceeding of a predetermined ratio between said pressures.

27. In a valve mechanism, in combination, an inlet opening, a valve for controlling the flow of fluid through said inlet opening, pressure responsive means for controlling said valve and operating when the pressures acting thereon are balanced for moving said valve to a position closing said inlet opening, said pressure responsive means including a member having a pressure area against which pressure fluid acts to urge said valve in an opening direction, means for subjecting said pressure area continuously to the pressure conditions at the supply side of said inlet opening, said pressure responsive means having another pressure area against which pressure acts to urge said valve in a closing direction, means for connecting said last mentioned pressure area in restricted communication with the space at the supply side of said inlet opening irrespective of the position of said valve, separate passage means for connecting said last mentioned pressure area in communication with a space containing fluid at a pressure below that at the supply side of said inlet opening, a plurality of valves, one for each of said passage means, for controlling the flow of fluid through said passage means, temperature responsive means for controlling one of said last mentioned valves, and pressure responsive means for controlling another of said last mentioned valves including means for precluding the exceeding of a predetermined maximum ratio between the pressure at the supply side of said inlet opening and the pressure in the second mentioned space irrespective of variations in the last mentioned pressure.

WIN W. PAGET.

REFERENCES CITED

The following references are of record in the file of this patent:

UNITED STATES PATENTS

| Number | Name | Date |
|---|---|---|
| 2,316,237 | Grunert et al. | Apr. 13, 1943 |
| 2,327,737 | Pendergast | Aug. 24, 1943 |
| Re. 22,272 | Price | Feb. 16, 1943 |
| 1,176,535 | Fulton | Mar. 21, 1916 |
| 510,017 | Gassett | Dec. 5, 1893 |
| 1,813,401 | Helmstaedter | July 7, 1931 |
| 1,848,031 | Spencer | Mar. 1, 1932 |
| 2,200,318 | Yonkers | May 14, 1940 |
| 2,280,128 | Price | Apr. 21, 1942 |
| 1,853,194 | Bogle | Apr. 12, 1932 |
| 2,265,461 | Wagner | Dec. 9, 1941 |
| 2,353,201 | Talbot | July 11, 1944 |
| 2,391,197 | Schwien | Dec. 18, 1945 |
| 1,575,725 | Stewart | Mar. 9, 1926 |

Certificate of Correction

Patent No. 2,425,000.  August 5, 1947.

WIN W. PAGET

It is hereby certified that errors appear in the printed specification of the above numbered patent requiring correction as follows: Column 8, line 37, for the word "suitable" read *suitably*; column 20, line 40, claim 9, for "saiad" read *said*; column 24, line 58, claim 24, for "flow or" read *flow of*; and that the said Letters Patent should be read with these corrections therein that the same may conform to the record of the case in the Patent Office.

Signed and sealed this 10th day of February, A. D. 1948.

[SEAL]

THOMAS F. MURPHY,
*Assistant Commissioner of Patents.*